(12) United States Patent
Berger et al.

(10) Patent No.: US 8,850,817 B2
(45) Date of Patent: Oct. 7, 2014

(54) METHOD FOR OPERATING A STEAM TURBINE POWER PLANT AND DEVICE FOR PRODUCING STEAM FROM LIGNITE

(75) Inventors: Georg Berger, Cologne (DE); Peter Moser, Cologne (DE); Toni Rupprecht, Essen (DE); Sandra Schmidt, Essen (DE)

(73) Assignee: RWE Power Aktiengesellschaft, Essen (DE)

( * ) Notice: Subject to any disclaimer, the term of this patent is extended or adjusted under 35 U.S.C. 154(b) by 348 days.

(21) Appl. No.: 13/318,311

(22) PCT Filed: Apr. 21, 2010

(86) PCT No.: PCT/EP2010/002428
§ 371 (c)(1),
(2), (4) Date: Oct. 31, 2011

(87) PCT Pub. No.: WO2010/124802
PCT Pub. Date: Nov. 4, 2010

(65) Prior Publication Data
US 2012/0055158 A1 Mar. 8, 2012

(30) Foreign Application Priority Data
Apr. 30, 2009 (DE) .......................... 10 2009 019 334

(51) Int. Cl.
*F01K 7/34* (2006.01)
*B01D 53/14* (2006.01)
*F01K 17/06* (2006.01)

(52) U.S. Cl.
CPC ................. *F01K 17/06* (2013.01); *Y02C 10/04* (2013.01); *B01D 53/1425* (2013.01); *B01D 2259/65* (2013.01); *Y02C 10/06* (2013.01); *B01D 53/1475* (2013.01)
USPC ................... 60/653; 60/646; 60/657; 60/678; 95/1; 95/156

(58) Field of Classification Search
USPC ............ 60/653, 646, 657, 670, 678; 423/220; 95/1, 156, 173; 96/201
See application file for complete search history.

(56) References Cited

U.S. PATENT DOCUMENTS 5,025,631 A * 6/1991 Garbo ............................ 60/655
5,146,857 A 9/1992 Spliethoff et al.
(Continued)

FOREIGN PATENT DOCUMENTS

| DE | 4323469 | 1/1995 |
| DE | 19518644 | 11/1996 |

(Continued)

OTHER PUBLICATIONS

PCT International Search Report mailed Apr. 12, 2012, received in corresponding PCT Application No. PCT/EP2010/002428, 2 pgs.

(Continued)

*Primary Examiner* — Hoang Nguyen
(74) *Attorney, Agent, or Firm* — Grossman Tucker Perreault & Pfleger, PLLC

(57) ABSTRACT

The invention relates to a method for operating a steam turbine power plant comprising at least one steam generator that is fueled by lignite, wherein the lignite is indirectly dried in a fluidized bed dryer that is heated at least partially with steam from the water-steam circuit of the steam generator. Said method is characterized in that the flue gas from the steam generator undergoes gas scrubbing to remove $CO_2$ and that the energy required for the gas scrubbing is at least partially extracted from the drying process in the fluidized bed. The invention additionally relates to a device for creating steam from lignite comprising a drying system for the lignite and a device to scrub $CO_2$ from the flue gas, wherein the drying process and the $CO_2$ gas scrubbing are thermally coupled to each other.

10 Claims, 1 Drawing Sheet

(56) References Cited

U.S. PATENT DOCUMENTS

| | | | |
|---|---|---|---|
| 5,421,166 A * | 6/1995 | Allam et al. | 62/649 |
| 2005/0022981 A1 * | 2/2005 | Helleur | 165/108 |
| 2005/0169825 A1 | 8/2005 | Cadours et al. | |
| 2006/0048920 A1 * | 3/2006 | Helleur | 165/108 |
| 2010/0212320 A1 | 8/2010 | Block et al. | |
| 2012/0227406 A1 * | 9/2012 | Kosaka et al. | 60/667 |
| 2012/0247104 A1 * | 10/2012 | Handagama et al. | 60/670 |
| 2012/0312020 A1 * | 12/2012 | Hume et al. | 60/657 |

FOREIGN PATENT DOCUMENTS

| | | |
|---|---|---|
| DE | 19518644 A1 | 11/1996 |
| DE | 19612186 A1 | 10/1997 |
| DE | 19931346 | 12/2000 |
| DE | 10319477 | 11/2004 |
| DE | 102008010367 | 10/2008 |
| DE | 102007023336 | 11/2008 |
| EP | 0551876 | 7/1993 |
| EP | 1967249 | 9/2008 |
| EP | 1967249 A1 | 9/2008 |

OTHER PUBLICATIONS

PCT International Preliminary Report on Patentability and Written Opinion issued Dec. 28, 2012, received in corresponding PCT Application No. PCT/EP2010/002428, 7 pgs.

PCT Translation of the International Preliminary Report on Patentability/Written Opinion mailed Mar. 21, 2013, received in corresponding PCT Application No. PCT/EP2010/002428, 9 pgs.

* cited by examiner

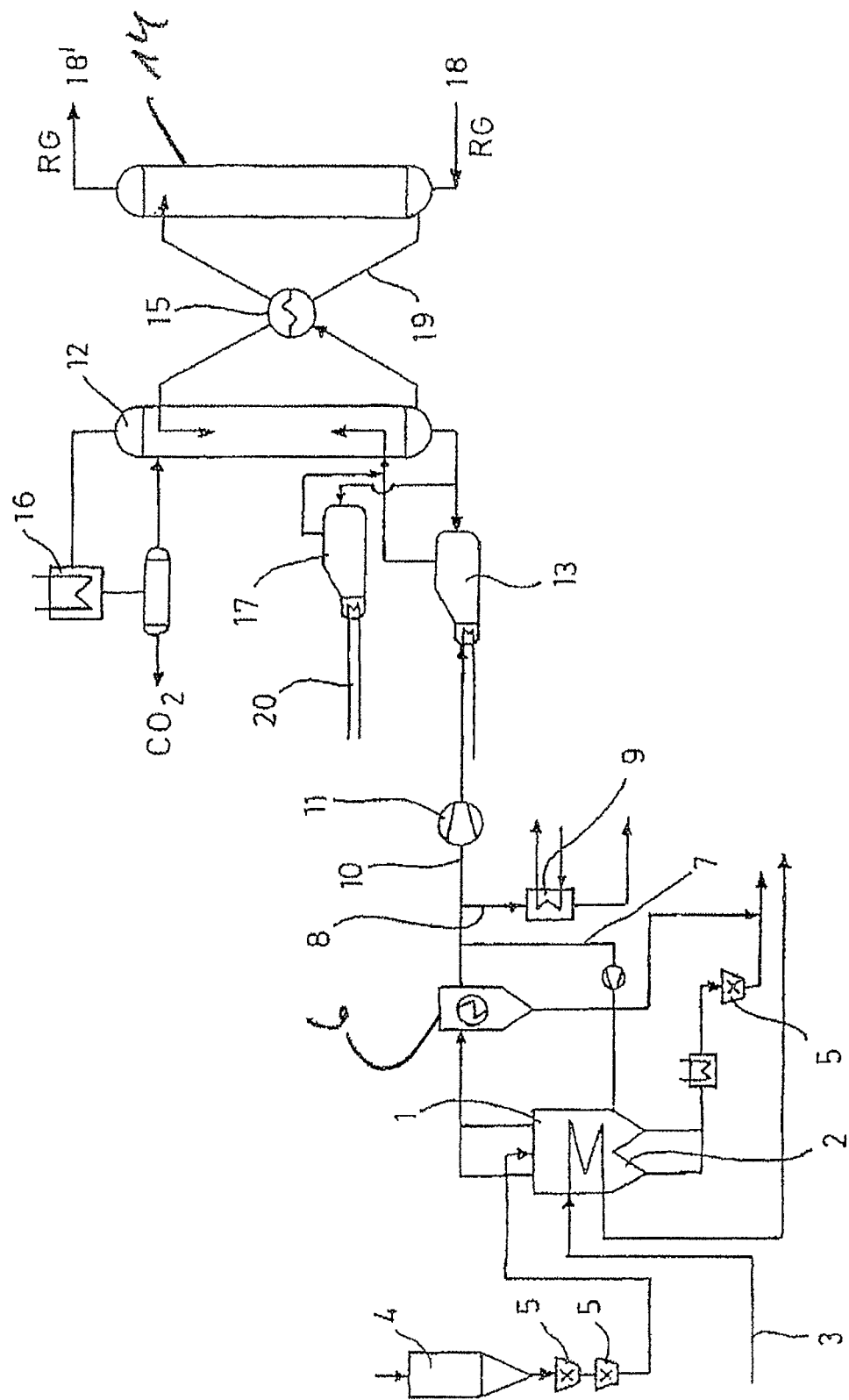

METHOD FOR OPERATING A STEAM TURBINE POWER PLANT AND DEVICE FOR PRODUCING STEAM FROM LIGNITE

The invention refers to a method for operating a steam turbine power plant having at least one steam generator which is fired with lignite, wherein the lignite is subjected to prior drying, preferably to indirect drying in a fluidized-bed drier which is heated at least partially with steam from the water-steam cycle of the steam generator.

Such a method is known from DE 103 19 477 A1, for example.

In comparison to power generation from bituminous coal, the combustion of lignite is accompanied by a higher $CO_2$ emission. This is mainly caused as a result of higher water content of the lignite. The pit-wet lignite has a water content of approximately 45 to 65% which is reduced to about 10 to 25% by means of drying. In order to achieve a more efficient lignite electrification, it is known to first subject the lignite to indirect drying in a fluidized-bed drier, wherein the fluidized-bed drier is heated at least partially with steam from the water-steam cycle of the steam generator and the energy of the vapor which results from the drying of the lignite is used for preheating the cold feed water from the water-steam cycle. This known method is also referred to as "WTA (fluidized-bed drying with internal waste heat utilization)". By means of this fluidized-bed drying method, utilizing the energy-rich vapor which issues from the drying plant in the drier, and using low-pressure steam from the steam cycle of the steam generator, an efficiency increase of 4 to 5 percent can be achieved compared with conventional lignite power plant techniques. The WTA technique is also known from DE 195 18 644 C2, for example.

In addition to the efficiency increase, reduced $CO_2$ release increasingly plays a prominent role in modern power plant technology. The reduced $CO_2$ release of fossil-fired power plants serves not only as a precautionary measure for climate protection but, moreover, increases the economical efficiency of the power generation. Therefore, the development of techniques to increase efficiency of power plants is intensively driven forward and, parallel to this, possibilities for $CO_2$ separation from power plant waste gases and for later underground storage of the $CO_2$ are developed.

The currently most practical technique for $CO_2$ separation is chemical $CO_2$ absorption which commercially can be retrofitted comparatively simply and is therefore quickly realizable. For $CO_2$ scrubbing, however, there is a requirement for considerable amounts of energy which ultimately are not available for power generation so that the realization of a chemical absorption of $CO_2$ is associated with significant efficiency loss.

A suitable method for separating $CO_2$ from industrial waste gases is known from EP 1 967 249 A1, for example. In this printed publication, the use of $CO_2$ scrubbing for cleaning flue gases from power plant processes is described. The scrubbing process which is described there comprises the gas scrubbing of the flue gas in an absorber with an aqueous solution of a $CO_2$-binding component and also the stripping of the $CO_2$-laden solvent in a desorber in which the solvent is guided in counterflow to hot steam of temperature 110° C. to 130° C. This steam is produced in a so-called reboiler by heating a partial flow of the solvent with the aid of low-pressure steam. The low-pressure steam at a pressure of about 4 bar is extracted from the crossover pipe between the intermediate-pressure section and low-pressure section of a steam turbine. At the increased temperatures in the desorber, the solvent releases the $CO_2$ again.

Considerable amounts of energy, which are extracted from the low-pressure section of the steam turbine for power generation, are required for regeneration of the solvent. In a non-optimized scrubbing process, up to 70% of the low-pressure steam quantity of a power plant unit can be required just for regeneration of the $CO_2$ solvent. This has the result that the electrical efficiency of a power plant can be reduced by up to 11 percent as a result of the low-pressure steam extraction alone.

For improving this energy balance, it is proposed in EP 1 967 249 A1, during regeneration of the $CO_2$-laden solvent, to use a stripping component so that the low-pressure steam quantity which is required for producing the stripping steam in the reboiler is reduced, which in turn has a bearing on the previously mentioned drop in efficiency.

Although a substantial reduction of the required low-pressure steam is already achieved using the method according to EP 1 967 249 B1, it is desirable to reduce the low-pressure steam consumption even more.

The invention is therefore based on the object of implementing a method for operating a steam turbine power plant which is fired with lignite and also a corresponding device with $CO_2$ scrubbing of the waste gas, specifically in such a way that the low-pressure steam quantity which is required for the method is further reduced. In particular, the controllability of the steam turbine power plant is thereby to be improved in each load state.

The object upon which the invention is based is achieved by means of a method for operating a steam turbine power plant with at least one steam generator which is fired with lignite, wherein the lignite is subjected to prior drying, preferably to indirect drying in a fluidized-bed drier which is heated at least partially with steam from the water-steam cycle of the steam generator, wherein the method is characterized in that the flue gas from the steam generator is subjected to gas scrubbing for the separation of $CO_2$ and the energy which is required for the gas scrubbing is at least partially extracted from the drying.

Suitable drying methods within the meaning of the invention are all drying methods in which vapors result, also mechanical-thermal dewatering, for example.

In this way, it is ensured according to the invention that some or all of the heat content of the vapor from the fluidized-bed drying is used for regeneration of the $CO_2$-laden scrubbing medium. Actually, using the heat content of the vapor from the lignite drying is known. The previous concepts for using the heat content of the vapor comprised the preheating of the boiler feed water or of the turbine condensate and/or the direct preheating of the combustion air by means of a heat displacement system. Moreover, the heat content of the vapor can be used in the coal drying itself, after a raising of the temperature or of the pressure has been carried out by means of multistage vapor compression, as is described in DE 103 477 B4, for example.

Using the heat content of the vapor for feed water preheating or for preheating the combustion air has the disadvantage, however, that only some of the heat content of the vapor is used. A considerable portion of the heat cannot be used. For example, in the case of a power plant unit with 1100 MW nominal power, about 100 MW of thermal power cannot be used.

The method according to the invention, depending upon the energy extracted from the vapor compression, not only has the advantage that less low-pressure steam has to be extracted from the crossover pipe from the intermediate-pressure section of the turbine to the low-pressure section of the turbine, but rather advantages in respect to available power also ensue, as previously mentioned.

In a preferred variant of the method according to the invention, it is provided that the residual heat of at least some of the vapor which results during the drying of the lignite is used for regeneration of a $CO_2$-laden solvent.

For regeneration of the $CO_2$-laden solvent, use can be made of at least one condensing heat exchanger which is exposed to admission of at least a partial flow of the vapor from the fluidized-bed drying.

A solvent mixture can also be understood by solvent within the meaning of the invention. The method which is described in EP 1 967 249 is advantageously carried out for $CO_2$ separation from the flue gas of the steam generator, in which method a stripping component is used during the regeneration of the $CO_2$-laden solvent, but with the difference that in the case of the method according to the invention the energy which is required for this is at least partially extracted from the fluidized-bed drying.

In order to ensure condensing of the vapor in the heat exchanger which is necessary for this, the vapor is preferably precompressed to a pressure of between 3 and 5 bar. That is to say, the pressure of the vapor is raised by means of vapor compression to a level which corresponds to a condensing temperature of about 130° C. This, compared with a possible use of low-temperature heat from the power plant process, has the advantage that no special measures are necessary for lowering the boiling point of the solvent.

The compression of the vapor is preferably carried out by means of low-pressure steam from the water-steam cycle of the steam generation process. Alternatively, a vapor compressor, or a plurality of vapor compressors, can also be operated by electric power.

In a preferred variant of the method according to the invention, it is provided that a partial quantity of the energy which is required for the $CO_2$-solvent regeneration is extracted in the form of low-pressure steam from the water-steam cycle of the steam turbine process. For example, about 50% of the required energy from the residual heat of the vapor which results during the drying of the lignite can be utilized. The remaining 50% can be gained in the form of low-pressure steam from the crossover pipe from the intermediate-pressure section to the low-pressure section of the steam turbine.

The vapor flow which results during the lignite drying in the fluidized-bed drier can be split into two partial flows, for example, wherein one part of the vapor is compressed and is used for regeneration of the $CO_2$-laden solvent, whereas another part of the resulting vapor is used for preheating the boiler feed water or the combustion air.

The invention furthermore refers to a device for producing steam from lignite, comprising at least one drier for drying pit-wet lignite, at least one steam generator which is fired with the dried lignite, and at least one steam turbine which is connected downstream to the steam generator, wherein this device is characterized in that provision is made for at least one device for $CO_2$ scrubbing of the flue gas from the steam generator, which device comprises at least one absorber column for loading a solvent with $CO_2$ from the flue gas and at least one desorber column for regeneration of the solvent, and also at least one reboiler which is associated with the desorber, wherein the reboiler is connected to the vapor outlet of the drier.

The drier is preferably designed as a fluidized-bed drier.

A condensing heat exchanger, which is connected to the sump of the desorber column, is to be understood by reboiler within the meaning of the invention, wherein the hot vapor, precompressed to about 4 bar, condenses at about 130° C. in the reboiler and yields its heat to the preheated $CO_2$-laden solvent and in the process leads to $CO_2$ release from the solvent.

At least one vapor compressor is preferably provided between the vapor outlet of the fluidized-bed drier and the reboiler. This vapor compressor can be driven by a steam turbine, for example, which is exposed to admission of low-pressure steam.

In an expedient development of the device according to the invention, it is provided that at least one second reboiler, which is connected to a low-pressure line of the water-steam cycle of the steam turbine process, is associated with the desorber.

The second reboiler is expediently connected to the crossover pipe between the intermediate-pressure section and the low-pressure section of a steam turbine.

The invention is subsequently explained with reference to the schematic layout which is shown in the drawing. For reasons of simplicity, only the lignite drying and the $CO_2$-gas scrubbing are shown. Furthermore, essential parts of the steam turbine power plant, such as the steam generator, the turbine, the regenerator and the water-steam cycle, are not shown. These parts of a steam turbine power plant are actually known, just as their interconnection is known.

The method according to the invention refers to the operation of a steam turbine power plant which comprises a steam generator which is fired with lignite. Pit-wet lignite has a water content of about 45 to 65%, which is reduced to about 10 to 25% by means of drying. The predried and correspondingly crushed lignite is fed to the steam generator for the purpose of combustion. The method which is described here uses the drying of the lignite in a stationary fluidized bed, wherein steam or the evaporated coal water is used as fluidizing means. The necessary drying energy is coupled into the fluidized bed via heat exchangers which are immersed in the fluidized bed. The fluidized-bed drier is designated 1 in the figure, which illustrates a steam turbine power plant operating system including a $CO_2$ scrubber according to the present disclosure. Its heat exchanger 2 is exposed to admission of bleed steam from the turbine via the bleed-steam line 3. The pit-wet lignite is extracted from a coal bunker 4, crushed in a mill 5, or in a plurality of mills, and dispatched to the fluidized-bed drier 1. At the lower end of the fluidized-bed drier 1, the dried lignite is extracted, cooled, and crushed once again by means of a mill, or by means of a plurality of mills, before this is fed to the steam generator, which is not shown. The vapor which results during the drying in the fluidized-bed drier 1 is dedusted in an electrostatic precipitator 6. Downstream of the electrostatic precipitator 6, a first partial flow 7 is compressed and fed again to the fluidized-bed drier 1 as fluidizing medium. A second partial flow 8 is discharged via a vapor condenser 9, wherein the heat of condensation is used for boiler feed water preheating or combustion air preheating.

A third partial flow 10, which constitutes an essential part of the vapor which results overall during the drying, is compressed in a vapor compressor 11 to a pressure of about 4 bar (absolute) and fed to a first reboiler 13 which is associated with the desorber column 12.

The desorber column 12 is part of the subsequently described $CO_2$-gas scrubber of the steam generator. The flue gas scrubbing plant which is used for this comprises at least one absorber column (scrubbing column) 14, the desorber column 12, a heat exchanger 15 which is provided between the absorber column 14 and the desorber column 12 and is preferably designed as a counterflow heat exchanger, a condenser 16 which is connected to the head of the desorber column 12, a first reboiler 13 which is connected to the sump of the desorber column 12, and a second reboiler 17 which is also connected to the sump of the desorber column 12.

The flue gas 18 from the steam generator is washed out in the absorber column 14 at low temperature (for example 40° C. to 60° C.) with an aqueous solution of a $CO_2$-binding component (solvent). Such a solvent can be a mixture consisting of water and monoethanolamine, for example.

After the $CO_2$-laden solvent 19 has been preheated via the counterflow heat exchanger 15, the preheated $CO_2$-laden solvent 19 is introduced into the desorber column (also referred to as a desorber). Here, hot steam at about 110° C. to 130° C., which is produced in one of the reboilers 13, 17 by heating a partial flow of the solvent, flows counter to the liquid solvent from the bottom close to the sump of the desorber column 12. At these increased temperatures, the solvent again releases the $CO_2$. Downstream of the desorber column 12, the hot $CO_2$/water-steam mixture is separated as a result of the condensing of the water in the condenser 16, wherein the water is then fed back into the process and the $CO_2$ is made available for storage or use. The hot low-$CO_2$ solvent is directed for cooling via the counterflow heat exchanger 15 in order to then be made available again to the scrubbing cycle as cooled low-$CO_2$ solvent. The flue gas 18', which is freed of $CO_2$, leaves the absorber column 14 at its upper end.

In the case of the $CO_2$-waste-gas scrubber, the method which is described in EP 1 967 249, for example, can be applied, using a stripping component. A chemical available on the market, which is essentially not mixable with the washing detergent, practically does not react with this, and which is to have a higher vapor pressure, that is to say a lower boiling point, than this, can be used as a stripping component. For example, alkanes, perhaps fluoroalkanes, come into consideration as stripping components.

This measure serves to lower the boiling point of the solvent in order to reduce the energy consumption for regeneration of the solvent as a result of this. The heated partial flow of solvent (solvent mixture) which is guided in the desorber column 12 (stripper) is referred to as stripping steam. This partial flow of heated solvent is produced by means of the reboilers 13, 17.

The invention is not limited to the depicted interconnection of the waste gas scrubbing plant according to the exemplary embodiment, rather other interconnections are also possible, like the ones described in EP 1 967 249, for example.

The second partial flow 8 of vapor can alternatively be used entirely for regeneration of the solvent. Preheating of the boiler feed water or of the combustion air can be carried out by means of feeding back the vapor condensate from the reboiler 13.

Differently from in the prior art, according to the invention some of the stripping steam is produced by means of a first vapor heated reboiler 13. For this, the third partial flow 10 of vapor from the fluidized-bed drier 1 is compressed in the vapor compressor 11 to a pressure of about 4 bar and condensed as far as possible in the first reboiler 13, specifically at a temperature of about 130° C. Depending upon design, about 50% of the energy which is required for solvent regeneration can be extracted from the vapors which result during the fluidized-bed drying. The rest of the energy quantity is procured according to the invention via a second reboiler 17 which is operated in a known manner with low-pressure steam from the crossover pipe 20 between the intermediate-pressure section and the low-pressure section of the steam turbine.

This low-pressure steam is available at about 4 bar and at the corresponding temperature so that conditioning of the steam is not usually necessary.

The first and the second reboilers 13, 17 are operated in parallel under approximately the same conditions. These are connected in parallel in the depicted exemplary embodiment. Which proportion of required stripping steam is made available from which reboiler 13, 17 is preferably controllable.

In this case, it is especially advantageous that both reboilers 13, 17 operate at the same condensing temperature.

The method according to the invention has the advantages that as a result of this the quantity of low-pressure steam from the turbine which is required for regeneration of the $CO_2$ scrubbing medium in the reboiler is significantly reduced, that as a result of this the highly-efficient low-pressure turbine contributes more towards power generation during the operating period with $CO_2$ separation, that more condensate (at low temperature) results downstream of the turbine and can again be used as a heat sink for otherwise non-exploitable low-temperature heat from the power plant process or from the $CO_2$ scrubbing plant, that the efficiency of the dry lignite power plant with $CO_2$ separation is altogether improved, that the availability of the power-generating part of the power plant with integrated $CO_2$ separation is ensured or improved in the process, that the controllability of the power plant is ensured by ensuring sufficient quantities of low-pressure steam in the LP section of the turbine and a hot ventilation of the turbine is counteracted, and that otherwise necessary modifications to the turbine on account of the low steam admission can be avoided if applicable.

LIST OF DESIGNATIONS

1 Fluidized-bed drier
2 Heat exchanger
3 Bleed-steam line
4 Coal bunker
5 Mills
6 Electrostatic precipitator
7 First partial flow of vapor
8 Second partial flow of vapor
9 Vapor condenser
10 Third partial flow of vapor
11 Vapor compressor
12 Desorber column
13 First reboiler
14 Absorber column
15 Heat exchanger
16 Condenser
17 Second reboiler
18 Flue gas
18' Flue gas
19 Solvent
20 Crossover pipe

What is claimed is:

1. A method for operating a steam turbine power plant having at least one steam generator which is fired with lignite, wherein the lignite is subjected to indirect drying in a fluidized-bed drier which is heated at least partially with steam from the water-steam cycle of the steam generator, wherein the flue gas from the steam generator is subjected to gas scrubbing for the separation of $CO_2$, wherein energy which is required for the gas scrubbing is extracted at least partially from vapor heated during the drying, and wherein the vapor is compressed subsequent to the fluidized-bed drier.

2. The method as claimed in claim 1, wherein the residual heat of at least some of the vapor which results during the drying of the lignite is used for regeneration of a $CO_2$-laden solvent.

3. The method as claimed in claim 1, wherein, for regeneration of the $CO_2$-laden solvent, use is made of at least one condensing heat exchanger, which is exposed to admission of at least a partial flow of the vapor from the drying.

4. The method as claimed in claim 3, wherein the vapor which is fed to the condensing heat exchanger is precompressed to a pressure of 3 to 5 bar.

5. The method as claimed in claim 4, wherein the compression of the vapor is carried out by means of low-pressure steam from the water-steam cycle of the steam generation process.

6. The method as claimed in claim 1, wherein a partial quantity of the energy which is required for solvent regeneration is extracted in the form of low-pressure steam from the water-steam cycle of the steam turbine process.

7. A device for producing steam from lignite, comprising at least one drier for drying pit-wet lignite, at least one steam generator which is fired with the dried lignite, at least one steam turbine which is connected downstream to the steam generator, wherein at least one device for $CO_2$ scrubbing of the flue gas from the steam generator, comprising at least one absorber column for loading a solvent with $CO_2$ from the flue gas, at least one desorber column for regeneration of the solvent and at least one reboiler which is associated with the desorber column, wherein the reboiler is connected to the vapor outlet of the drier, and wherein at least one vapor compressor is provided between the vapor outlet of the fluidized-bed drier and the reboiler.

8. The device as claimed in claim 7, wherein the drier is designed as a fluidized-bed drier.

9. The device as claimed in claim 7, wherein at least one second reboiler is associated with the desorber column and is connected to a low-pressure line of the water-steam cycle.

10. The device as claimed in claim 9, wherein the second reboiler is connected to a crossover pipe between the intermediate-pressure section and the low-pressure section of a steam turbine.

* * * * *